(12) United States Patent
Putrello

(10) Patent No.: US 12,076,741 B2
(45) Date of Patent: Sep. 3, 2024

(54) FLUID DISPENSING DEVICE AND PUMP

(71) Applicant: THE FOUNTAINHEAD GROUP, INC., New York Mills, NY (US)

(72) Inventor: Andrew C. Putrello, Utica, NY (US)

(73) Assignee: THE FOUNTAINHEAD GROUP, INC., New York Mills, NY (US)

( * ) Notice: Subject to any disclaimer, the term of this patent is extended or adjusted under 35 U.S.C. 154(b) by 215 days.

(21) Appl. No.: 17/286,674

(22) PCT Filed: Oct. 21, 2019

(86) PCT No.: PCT/US2019/057135
§ 371 (c)(1),
(2) Date: Apr. 19, 2021

(87) PCT Pub. No.: WO2020/082063
PCT Pub. Date: Apr. 23, 2020

(65) Prior Publication Data
US 2021/0362172 A1    Nov. 25, 2021

Related U.S. Application Data

(60) Provisional application No. 62/747,876, filed on Oct. 19, 2018.

(51) Int. Cl.
*B05B 3/12* (2006.01)
*A01M 7/00* (2006.01)
(Continued)

(52) U.S. Cl.
CPC .............. *B05B 3/12* (2013.01); *A01M 7/001* (2013.01); *A01M 7/0071* (2013.01); *B05B 3/008* (2013.01); *B05B 9/0855* (2013.01); *B05B 12/32* (2018.02)

(58) Field of Classification Search
CPC .......... B05B 3/12; B05B 3/008; B05B 9/0855; A01M 7/0071; A54D 40/04; B65G 65/46;
(Continued)

(56) References Cited

U.S. PATENT DOCUMENTS 2,954,261 A * 9/1960 Taupin .................. B65G 65/46
266/183
3,409,119 A * 11/1968 Mayrath ................ B65G 33/14
198/671
(Continued)

FOREIGN PATENT DOCUMENTS

JP     2003042912 A  *  2/2003
JP     2009191808 A  *  8/2009
(Continued)

OTHER PUBLICATIONS

Machine Translation of JP-2003042912-A Description, Espacenet, Apr. 2023, 4 Pages (Year: 2023).*
(Continued)

*Primary Examiner* — Christopher R Dandridge
*Assistant Examiner* — Kevin Edward Schwartz
(74) *Attorney, Agent, or Firm* — BOND, SCHOENECK & KING, PLLC; George R. McGuire

(57) ABSTRACT

An electrically powered, portable fluid dispenser that includes a main housing and extendable wand that when used in conjunction with an electric motor, a self-feeding tentacle pumping spinning element, tentacle feed tube, and focusable vibrating backstops, is able to pump, atomize, and dispense, low and high viscosity fluid with controlled directionality and droplet size.

3 Claims, 5 Drawing Sheets

(51) Int. Cl.
  *B05B 3/00* (2006.01)
  *B05B 9/08* (2006.01)
  *B05B 12/32* (2018.01)

(58) Field of Classification Search
  CPC ........ B65G 33/00; B65G 33/14; B85D 88/68; B65D 83/0011; B65D 88/64; B65D 88/66; G01F 13/005
  USPC .............................. 239/222.11; 222/198, 200
  See application file for complete search history.

(56) References Cited

U.S. PATENT DOCUMENTS

| | | | |
|---|---|---|---|
| 3,666,177 A | 5/1972 | Mencacci | |
| 3,726,392 A * | 4/1973 | Rastoin | B65G 33/00 198/662 |
| 3,917,167 A | 11/1975 | Pearce et al. | |
| 4,392,614 A * | 7/1983 | Groth | B05B 3/087 239/222 |
| 5,207,381 A | 5/1993 | Gill | |
| 5,216,952 A * | 6/1993 | Hoff | B41F 7/28 101/147 |
| 5,529,055 A * | 6/1996 | Gueret | B05B 17/0646 128/200.22 |
| 5,842,642 A * | 12/1998 | Plasko | E04F 21/10 239/220 |
| 2006/0168746 A1* | 8/2006 | Guyuron | A47K 7/04 15/23 |
| 2009/0250528 A1* | 10/2009 | Schnuckle | B05B 17/08 239/18 |
| 2014/0252124 A1* | 9/2014 | Chen | B05B 3/08 239/221 |
| 2014/0367492 A1* | 12/2014 | Tench | B05B 17/0638 239/380 |
| 2015/0129682 A1 | 5/2015 | Mitchell et al. | |
| 2017/0320081 A1 | 11/2017 | Heuckeroth | |

FOREIGN PATENT DOCUMENTS

| | | | |
|---|---|---|---|
| JP | 4747121 B2 * | 8/2011 | |
| JP | 2012050945 A * | 3/2012 | |

OTHER PUBLICATIONS

Machine Translation of JP-2009191808-A Description, Espacenet, Apr. 2023, 6 Pages (Year: 2023).*
Machine Translation of JP-4747121-B2 Description, Espacenet, Apr. 2023, 6 Pages (Year: 2023).*
Machine Translation of JP-2012050945-A Description, Espacenet, Apr. 2023, 6 Pages (Year: 2023).*
International Search Report Form PCT/ISA/210, and Written Opinion Form PCT/ISA/237, International Application No. PCT/US2019/057135, pp. 1-8 International Filing Date Oct. 19, 2019 mailing date of search report Dec. 17, 2019.
Extended European Search Report, EPO Form 1507S, App. No. 19872804.3 pp. 1-6, dated Jul. 27, 2022.

* cited by examiner

FLUID DISPENSING DEVICE AND PUMP

CROSS-REFERENCE TO RELATED APPLICATIONS

The present application is the United States National Stage Application of International Application No. PCT/US19/057135, filed Oct. 21, 2019, which relates and claims priority to U.S. Provisional Application Ser. No. 62/747,876, filed Oct. 19, 2018, the entire disclosure of which is hereby incorporated by reference.

GOVERNMENT FUNDING

N/A

FIELD OF THE INVENTION

The present disclosure is directed generally to a portable fluid dispenser and, more particularly, to a portable fluid dispenser that uses a self-feeding tentacle pump, a self-feeding spinning element pump, and vibrating directional elements, to move, atomize, and dispense fluid.

BACKGROUND

Fluid dispensers and sprayers have been used in many different environments and can be particularly useful when spraying water, paint, stain, sealers, and pesticides. One of the most common ways to atomize and spray fluid is to generate high pressure within a fluid filled container and then release the pressurized fluid through a small opening. The pressure is commonly generated using a manual pump, electric pump, gear pump, or some type of aerosol. Regardless of the method used, the end result is forcing fluid through a small opening of various shapes and sizes under pressure. Spraying liquids through small openings requires higher pressure as the viscosity of the fluid increases. Higher pressure means more manual pumping or more electrical power to generate the required pressure. In addition, spraying liquid through small openings can cause clogging, especially with high viscosity fluids such as deck stain and paint.

There are also methods to spray fluid that use a rotating mechanism that do not require high pressure but have the disadvantage of spraying in 360 degrees. For many applications such as spraying paint, stain, and pesticides spraying a 360 degree pattern would cause the user to be sprayed by the backspray. This is particularly troublesome when spraying pesticides. When spraying pesticides the user is often required to wear protective clothing to prevent the backspray of the spinning mechanisms from covering their bodies. In addition, the spinning mechanisms require outside pumping mechanisms that are not dissimilar to the pressure generating mechanisms that are commonly used in sprayers that force liquid through small openings. Many of the pumping mechanisms currently used are restricted to low viscosity fluids, generate excessive friction, are mechanically complex, bulky, require excessive electrical power, are difficult and expensive to manufacture, susceptible to clogging, and cannot pump over great distances. Most fluid dispensers include a dip tube that links the pump to the fluid and dispenser opening. It would be advantageous to have a dip tube that could pump.

Accordingly, there is a need in the art for a low power, portable fluid dispenser, that uses a self-feeding dip tube, a self-feeding atomizing spinning element, and vibrating directional elements, to gently move, atomize, and dispense fluid in a forward direction without the need to generate high pressure. The present invention addresses the aforementioned problems by using a structural design that is aimed at minimizing the negative effects thus increasing the likelihood that the individual will use the portable fluid dispenser and realize its benefits.

SUMMARY

The present disclosure is directed to an electrically powered portable fluid dispenser that includes a main housing and extendable wand that when used in conjunction with an electric motor, a self-feeding tentacle pumping spinning element, a tentacle feed tube, and focusable vibrating backstops, is able to pump, atomize, and dispense, low and high viscosity fluid in the forward direction.

It would be advantageous to provide a an atomizer that pumped its own fluid

It would also be advantageous to provide a . . . fluid dispenser that could move fluid without high pressure.

It would further be advantageous to provide a fluid dispenser that could atomize without high pressure.

It would also be advantageous to provide a fluid dispenser that could spray both low and high viscosity fluids without clogging.

It would further be advantageous to provide a fluid dispenser that could redirect backspray forward.

It would also be advantageous to provide a fluid dispenser that could atomize fluid using low power.

It would further be advantageous to provide a dip tube that could pump.

It would also be advantageous to provide a fluid dispenser that could reatomize back spray.

It would further be advantageous to provide an atomizing spinning element that could pull and release backspray in the forward direction.

According to an aspect is a fluid dispenser for dispensing fluid from a fluid container, comprising: a main housing having a passage through which fluid may be expelled; a tentacle conduit extending between the main housing and the fluid container; a pumping spinning element mounted within the main housing; a plurality of tentacles movably mounted within the tentacle conduit and terminating at one end at the pumping spinning element and at their opposite ends within the fluid container; a motor selectively actuable to provide power to the pumping spinning element, whereby actuation of the motor causes the pumping spinning element to rotate which in turn causes the plurality of tentacles to move.

According to an embodiment, the fluid dispenser further comprises a first vibration member mounted within the main housing and positioned for engagement with fluid being expelled from the main housing.

According to an embodiment, the fluid dispenser comprises a second vibration member mounted within the main housing and positioned for engagement with fluid being expelled from the main housing.

According to an embodiment, the fluid dispenser further comprises a plurality of bristles attached to and extending from the pumping spinning element, at least some of the bristles periodically contacting the first and second vibrating members.

According to an embodiment, the plurality of bristles comprise paired sets of bristles wherein each paired set extend at 180 degree intervals from one another and one of the bristles in the paired set is longer than the other of the bristles.

According to an embodiment, the fluid dispenser further comprises a handle positioned around the tentacle conduit.

According to an aspect is a pumping device, comprising a tentacle conduit; a terminating element to which one end of the tentacle conduit terminates; a plurality of tentacles movably mounted within the tentacle conduit and terminating at one end at the terminating element, each tentacle comprising a plurality of protuberances formed at periodic intervals along the length of each tentacle; and a motor selectively actuable to provide power to the terminating element, whereby actuation of the motor causes the terminating element to rotate which in turn causes the plurality of tentacles to move.

According to an aspect is a pumping device, comprising a tentacle conduit; a pumping spinning element to which one end of the tentacle conduit terminates; a plurality of tentacles movably mounted within the tentacle conduit and terminating at one end at the pumping spinning element; and a motor selectively actuable to provide power to the pumping spinning element, whereby actuation of the motor causes the pumping spinning element to rotate which in turn causes the plurality of tentacles to move.

According to an aspect is a fluid dispenser for dispensing fluid from a fluid container, comprising a main housing having a passage through which fluid may be expelled; a spinning pumping element mounted within the main housing; a motor selectively actuable to provide power to the pumping spinning element, whereby actuation of the motor causes the pumping spinning element to rotate; a first vibration member mounted within the main housing and positioned for engagement with fluid being dispensed from the main housing; and a plurality of bristles attached to and extending from the pumping spinning element, at least some of the bristles periodically contacting the first second vibrating member.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes, with reference to FIGS. 1 to 6, each element of a portable fluid dispenser 12. A full description of the function and operation of the portable fluid dispenser 12 will follow. With fluid dispenser 12, it is possible to move a tremendous amount of fluid with extremely low pressure with a relatively low weight unit.

Figure 1:
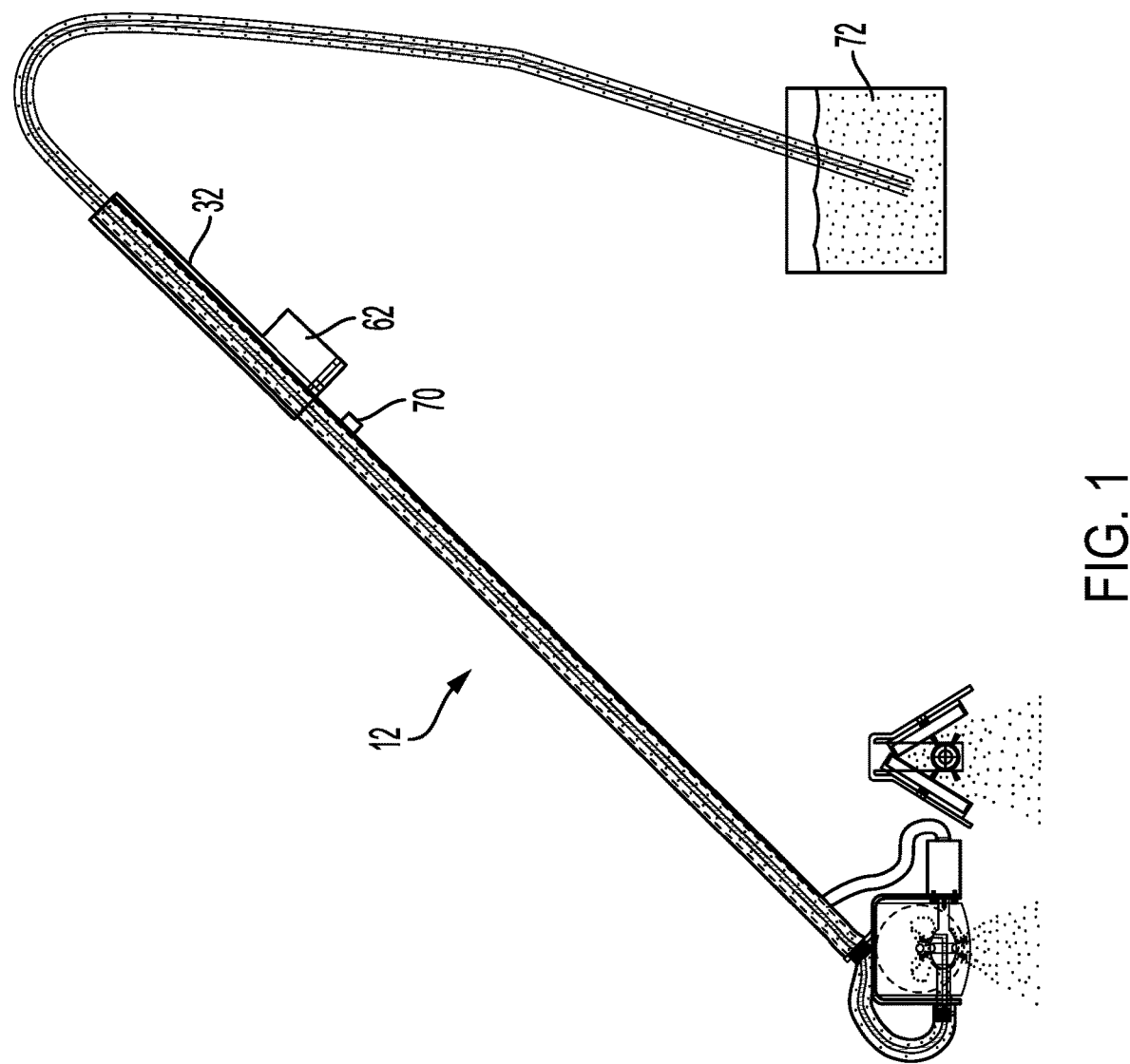
FIG. 1 is a side elevation view of a fluid pumping dispenser, in accordance with an embodiment.
Figure 3:
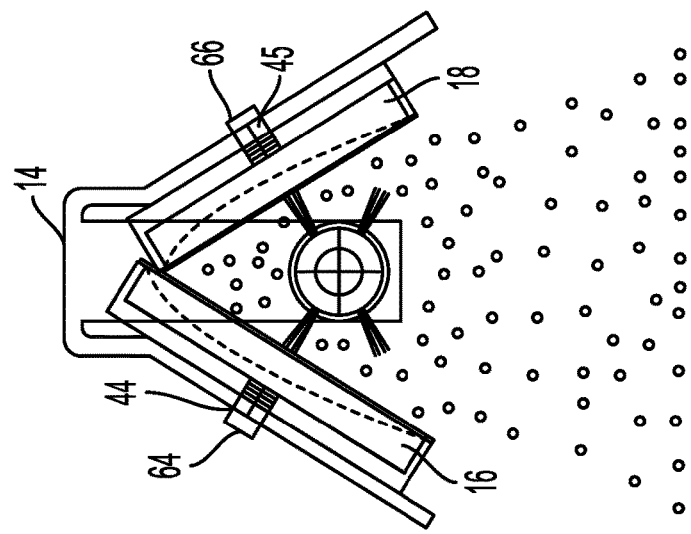
FIG. 3 is an enlarged side perspective view of a portion of a fluid pumping dispenser, in accordance with an embodiment.
Figure 2:
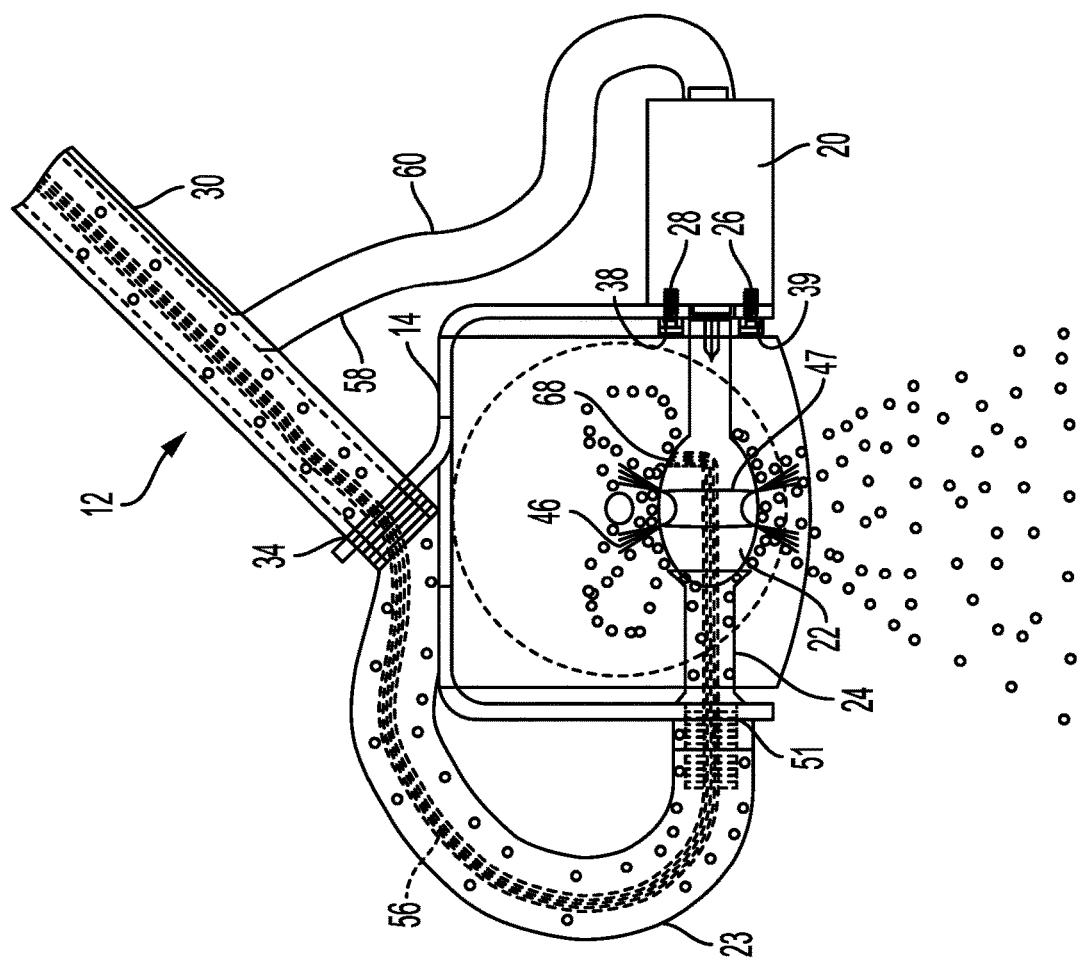
FIG. 2 is an enlarged side perspective view of a portion of a fluid pumping dispenser, in accordance with an embodiment.
Figure 4:
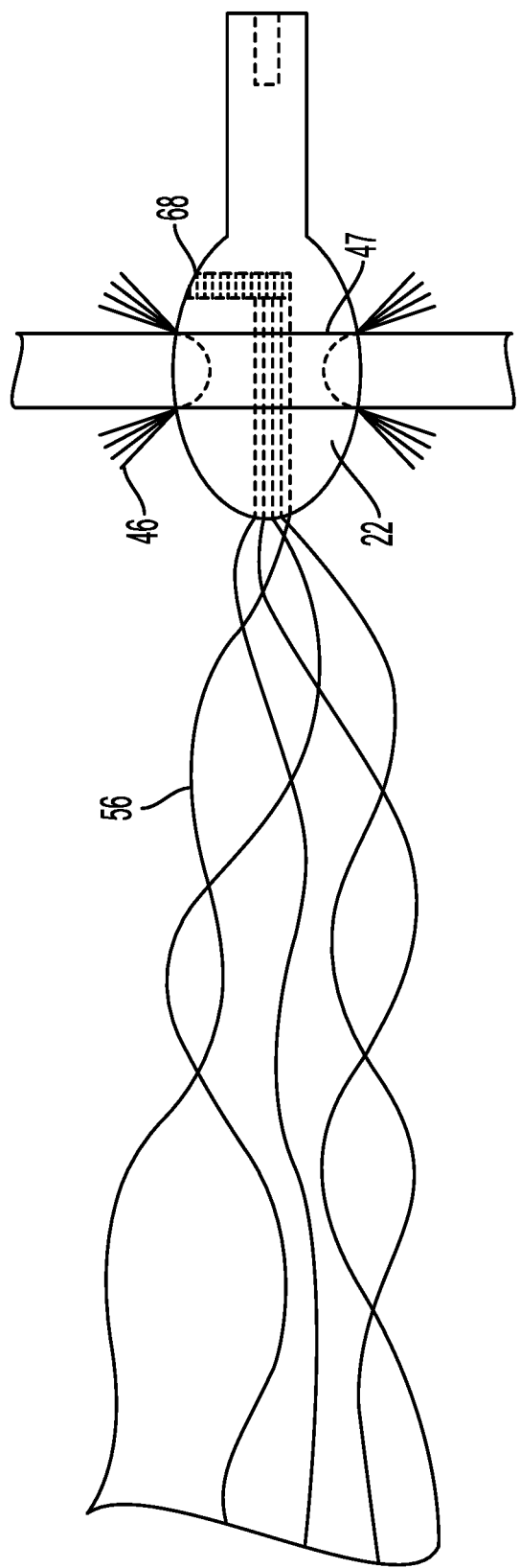
FIG. 4 is an enlarged side perspective view of a portion of a fluid pumping dispenser, in accordance with an embodiment.
Figure 5:
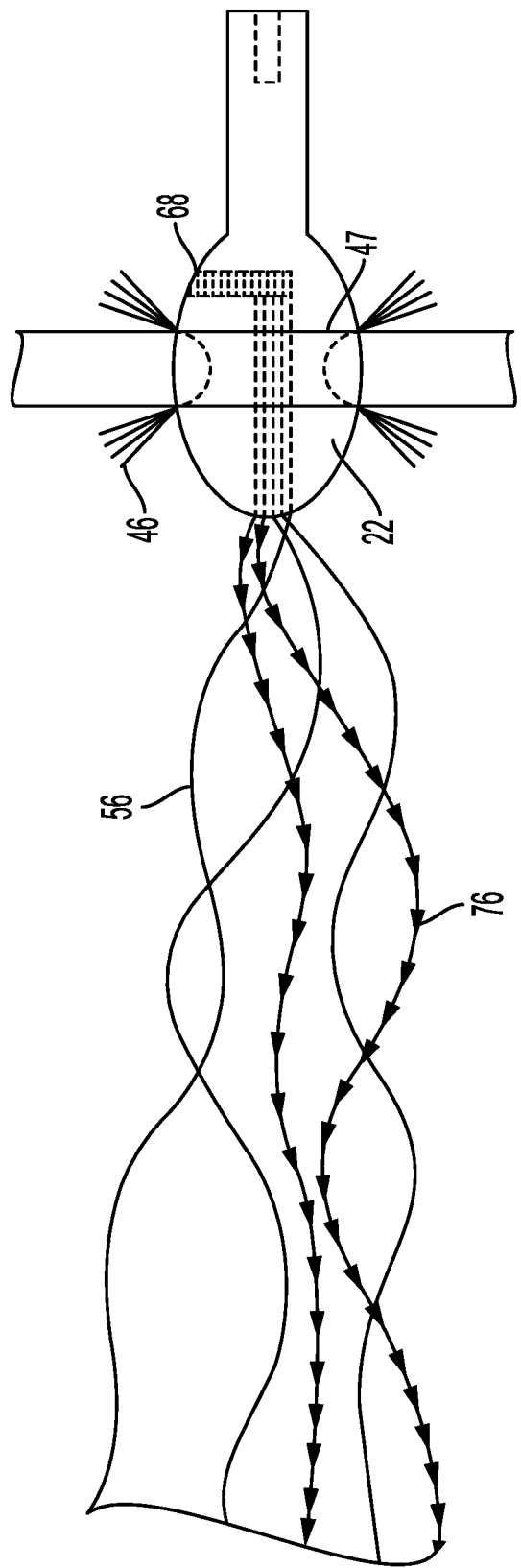
FIG. 5 is an enlarged side perspective view of a portion of a fluid pumping dispenser, in accordance with an embodiment.
Figure 6:
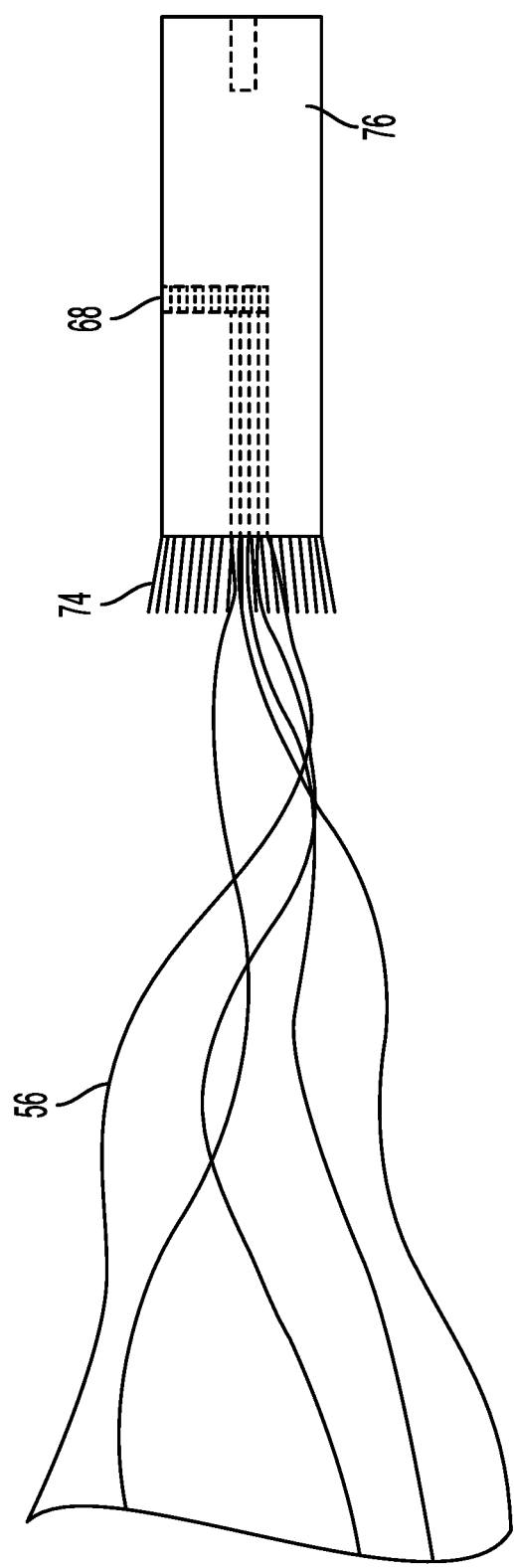
FIG. 6 is an enlarged side perspective view of a portion of a fluid pumping dispenser, in accordance with an embodiment.

Referring to FIG. 1, in one embodiment, is the portable fluid dispenser 12 of the invention that includes: a main housing 14, a tentacle feed tube adapter 24 that is threadably coupled to the main housing 14 via threaded mounting hole 51, a tentacle feed tube 23 that is removeably coupled to the tentacle feed tube adapter 24, a left vibrator 16 that is threadably coupled to main housing 14 via mounting hole 44 and left vibrator mounting screw 64, a right vibrator 18 that is threadably coupled to main housing 14 via mounting hole 45 and right vibrator mounting screw 66, a motor 20 that is threadably coupled to the main housing 14 via mounting holes 38 and 39 using motor mounting screw one 26 and motor mounting screw two 28, positive motor wire 58 that electrically connects the motor 20 to the switch 70 and positive lead of battery 62, and negative motor wire 60 that electrically connects motor 20 with negative lead of the battery 62. The present invention also includes a tentacle pumping spinning element 22 that has bristles 46 secured by a compressible bristle ring 47 around its perimeter. The tentacle pumping spinning element 22 has a plurality of wire tentacles 56 mounted coaxially through the center of the tentacle pumping spinning element 22 and are secured using set tentacle set screw 68. The present invention also includes an extendable wand 30 that is threadably coupled to the main housing 14 via mounting hole 34 and includes a cushioned handle 32.

In operation and referring to FIGS. 1 to 4, when power is applied through switch 70 the electric motor 20 spins at a high rpm causing the tentacle pumping spinning element 22 to also rotate at high rpm. The flexible tentacles 56 made from metal, plastic, or other suitable materials, easily rotate within the tentacle feed tube 23 that is directed through the center of the extendable wand 30 and terminates in the fluid container 72, the flexible nature of this pumping method allows for bending around curves while generating a pressure differential that causes fluid to rise in the tentacle feed tube 23 delivering the fluid to the tip of the solid portion of the tentacle pumping spinning element 22 through the tentacle feed tube adapter 24.

Once the fluid is introduced to the tip of the solid portion of the tentacle pumping spinning element 22 it is pulled up rapidly to the center outside perimeter of the tentacle pumping spinning element 22 due to a strong low pressure gradient created by the change in diameter from the tip of the solid portion of the tentacle pumping spinning element 22 to the center of the solid portion of the tentacle pumping spinning element 22 during rotation. As the fluid climbs to the outside center perimeter of the tentacle pumping spinning element 22 it is rapidly atomized into a fine mist and is ejected. During ejection the mist encounters the bristles 46 which further atomize the mist and further eject the droplets out in a 360 degrees pattern.

To redirect the backspray forward, the bristles 46 are slightly longer at 180 degree increments around the perimeter of the tentacle pumping spinning element 22. These longer bristles 46 hit the left vibrator 16 and right vibrator 18 upon rapid rotation setting them to vibrate at hundreds of times per second. This causes the backspray to be reatomized and bounced in the desired forward direction. As the backspray is bounced forward it is sucked back into the system by the low pressure gradient created by the tentacle pumping spinning element 22 and the cycle repeats. The speed of the motor 20 can be varied to change the droplet sizes and vibratory rate of the vibrating backstops. The vibrating back stops 16, 18 are hollow with rubber or hard plastic skins that vibrate rapidly upon contact with the rotating bristles 46. The vibrating back stops 16, 18 also have an inside bottom surface that is shaped into a parabola that focuses the shock waves in the drum to reflect atomized droplets forward in space where they can easily be redrawn into the system by the solid portion of the tentacle pumping spinning element 22. The vibrating backstops 16, 18 can also be made to change shape if desired by mechanical action or by adding an air tube that connects to the inside of the vibrating drum and can be used to draw air out or push air into the left vibrator 16 and right vibrator 18 varying the shape of the vibrating surface. The angles of the vibrating backstops 16, 18 can also be changed to direct the spray to any desired angle for wider or narrower spray patterns.

The tentacle pumping spinning element 22 is essentially a pumping dip tube. The tentacles 56 of the tentacle pumping spinning element 22 can be of different shapes and sizes to accommodate a variety of liquids from low to high viscosity. The solid portion of the tentacle pumping spinning element 22 can have different surfaces to accommodate different fluids. The tentacles 56 can be as long as necessary to move fluids over great distances able to bend around obstacles. The shape of the tentacles 56 can be of numerous varieties that include straight or slightly twisted to enhance fluid movement. The number of tentacles 56 can be varied to accommodate different viscosities and diameters of the tentacle feed tube 23. As the motor 20 rotates the tentacle pumping spinning element 22 the tentacles 56 are flung to the inside perimeter of the tentacle feed tube 23 by centripetal acceleration thus generating a pressure differential inside the tentacle feed tube 23. The tentacles 56 are also tighter upon rotation at close proximity to the motor 20. This causes the diameter of the tentacles 56 bundle to vary over distance also resulting in a pressure differential. The tentacles 56 can also be made from individually twisted wires. The solid portion of the tentacle pumping spinning element 22 creates a tremendous low pressure gradient due to its varied diameter and rotation. This enables the tentacle pumping spinning element 22 to very efficiently draw fluid up that is delivered to the tip of the solid portion of the tentacle pumping spinning element 22 by the tentacles 56 as described above.

In addition, the tentacle pumping spinning element 22 is self-cleaning, low friction, and will not clog. In normal use, there is nearly 200 g's of force generated at the surface of the tentacle pumping spinning element 22 preventing any buildup of material deposits. It is important to note the tentacle pumping spinning element 22 is able to atomize and dispense fluid without the bristles 46 and a cam or horizontal element can be used in place of the longer bristles 46 placed at increments of 180 degrees to set the left vibrator 16 and right vibrator 18 vibrating to redirect fluid in the forward direction.

FIG. 5 shows an alternative embodiment that includes geometric shapes 76 coaxially positioned on the tentacles 56 to enhance fluid movement. The geometric shapes would provide the same change in pressure as the solid portion of the tentacle pumping spinning element 22 as described above and can be injection molded or made out of any suitable material.

FIG. 6 shows an additional alternative embodiment of the tentacle pumping spinning element 22 that uses a cylindrical 76 or other geometric shape in place of the low pressure creating solid portion of the tentacle pumping spinning element 22. In this alternative embodiment, a plurality of tentacles 56 are shorter at the junction between the cylinder 76 and the tentacles 56 and are positioned 360 degrees coaxially around the perimeter. As the fluid is conveyed up the tentacles 56 and out of the top of the tentacle feed tube 23 the fluid is sprayed out from the spinning tentacles 56 from centripetal force where the droplets encounter the shorter coaxial perimeter tentacles 56 and are further atomized into a fine mist.

The tentacle pump can pump virtually any viscosity from water to house paint, and even solids such as baking flour. In testing, the maximum pump height achieved is 4 feet with a flow rate of 2800 mL/min (0.740 gallons per minute) using 7 volts and 5.6 amps. In testing, 4000 mL/min (1.05 gallons per minute) 16 inches high using 7.1 volts and 4 amps has been pumped. As there are very few parts in the tentacle pumps themselves with the tentacles and dip tube making up the entire pump. Thus, the tentacle pumps are very consistent, reliable, durable, require very little raw material, clean rapidly with a burst of clean water, and can be manufactured at a very low cost.

The tentacles can be made of metal or plastic and vary in diameter from 0.008" to 0.025". The tentacles can be made of various shapes and may include geometric shapes along its axis, or have profiles resembling sine waves of different wavelengths and amplitudes.

Tentacle pumps use anywhere from 1 to 11 tentacles have actually been developed with a typical tentacle pump using 4 tentacles that are 025" in diameter within a ⅜" (0.375") inside diameter.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A fluid dispenser for dispensing fluid from a fluid container, comprising:

a. a main housing having a passage through which fluid may be expelled;

b. a tentacle conduit extending between the main housing and the fluid container;

c. a pumping spinning element mounted within the main housing;

d. a plurality of tentacles movably mounted within the tentacle conduit and terminating at one end at the pumping spinning element and at their opposite ends within the fluid container;
e. a motor selectively actuable to provide power to the pumping spinning element, whereby actuation of the motor causes the pumping spinning element to rotate which in turn causes the plurality of tentacles to move;
f. a first vibration member mounted within the main housing and positioned for engagement with fluid being expelled from the main housing;
g. a second vibration member mounted within the main housing and positioned for engagement with fluid being expelled from the main housing; and
h. a plurality of bristles attached to and extending from the pumping spinning element, at least some of the bristles periodically contacting the first and second vibration members.

2. The fluid dispenser according to claim 1, wherein the plurality of bristles comprise paired sets of bristles wherein each paired set extend at 180 degree intervals from one another and a first bristle of the plurality of bristles being longer than a second bristle of the plurality of bristles.

3. The fluid dispenser according to claim 1, further comprising a handle positioned around the tentacle conduit.

\* \* \* \* \*